United States Patent [19]

Marx

[11] Patent Number: 5,204,933
[45] Date of Patent: Apr. 20, 1993

[54] SLEEVE COUPLING FOR A BRANCHING OR CONNECTING POINT OF CABLES

[75] Inventor: Karl-Heinz Marx, Garbsen, Fed. Rep. of Germany

[73] Assignee: Kabelmetal Electro GmbH, Fed. Rep. of Germany

[21] Appl. No.: 802,209

[22] Filed: Dec. 4, 1991

[30] Foreign Application Priority Data

Dec. 8, 1990 [DE] Fed. Rep. of Germany ....... 4039242

[51] Int. Cl.$^5$ .............................................. G02B 6/36
[52] U.S. Cl. ..................................................... 385/53
[58] Field of Search ........................... 385/53, 105–107

[56] References Cited

U.S. PATENT DOCUMENTS

| | | | |
|---|---|---|---|
| 3,455,336 | 7/1969 | Ellis | 138/156 |
| 4,891,640 | 1/1990 | Ip | 385/53 X |
| 5,099,399 | 3/1992 | Miller et al. | 385/53 X |
| 5,119,457 | 6/1992 | Callahan | 385/107 |

Primary Examiner—Akm E. Ullah
Attorney, Agent, or Firm—Ware, Fressola, Van Der Sluys & Adolphson

[57] ABSTRACT

A sleeve coupling for a branching or connecting point of cables, particularly of communication cables with optical waveguides, which has a sleeve surrounding the branching or connecting point, and end bodies sealing the coupling in a liquid-tight manner at the ends. Each end body contains at least one through opening for leading a cable into the sleeve coupling or for leading the cable out of the sleeve coupling. The sleeve is a stable plastic tube with a longitudinal slot. The end bodies each are provided with a circumferential surface on which the sleeve is supported. The through openings are designed as radial slots adapted to receive the cables. A heat-shrunk collar surrounds the sleeve and the end bodies. In the entrance region of the sleeve coupling, there is provided an extension for the end body coated at least in part with a hot-melt adhesive. The extension is in contact, at least in part, with the inner surface of the heat-shrunk collar.

14 Claims, 4 Drawing Sheets

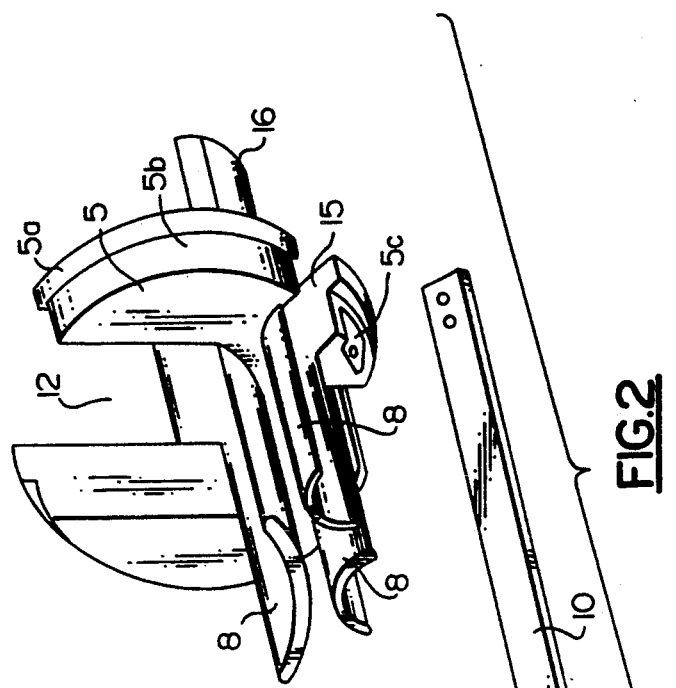
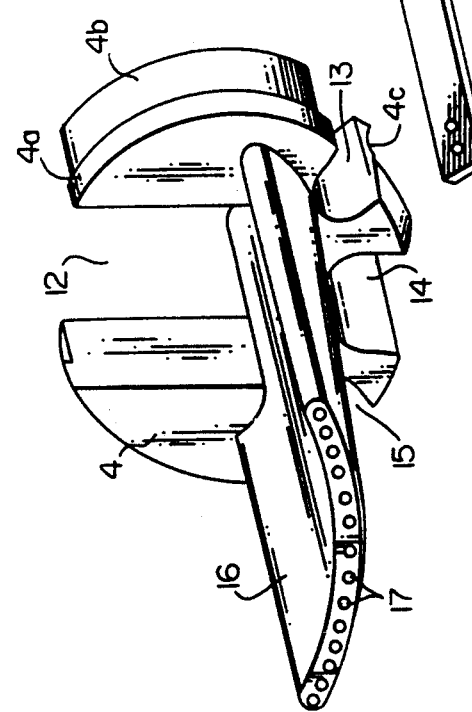
FIG.2

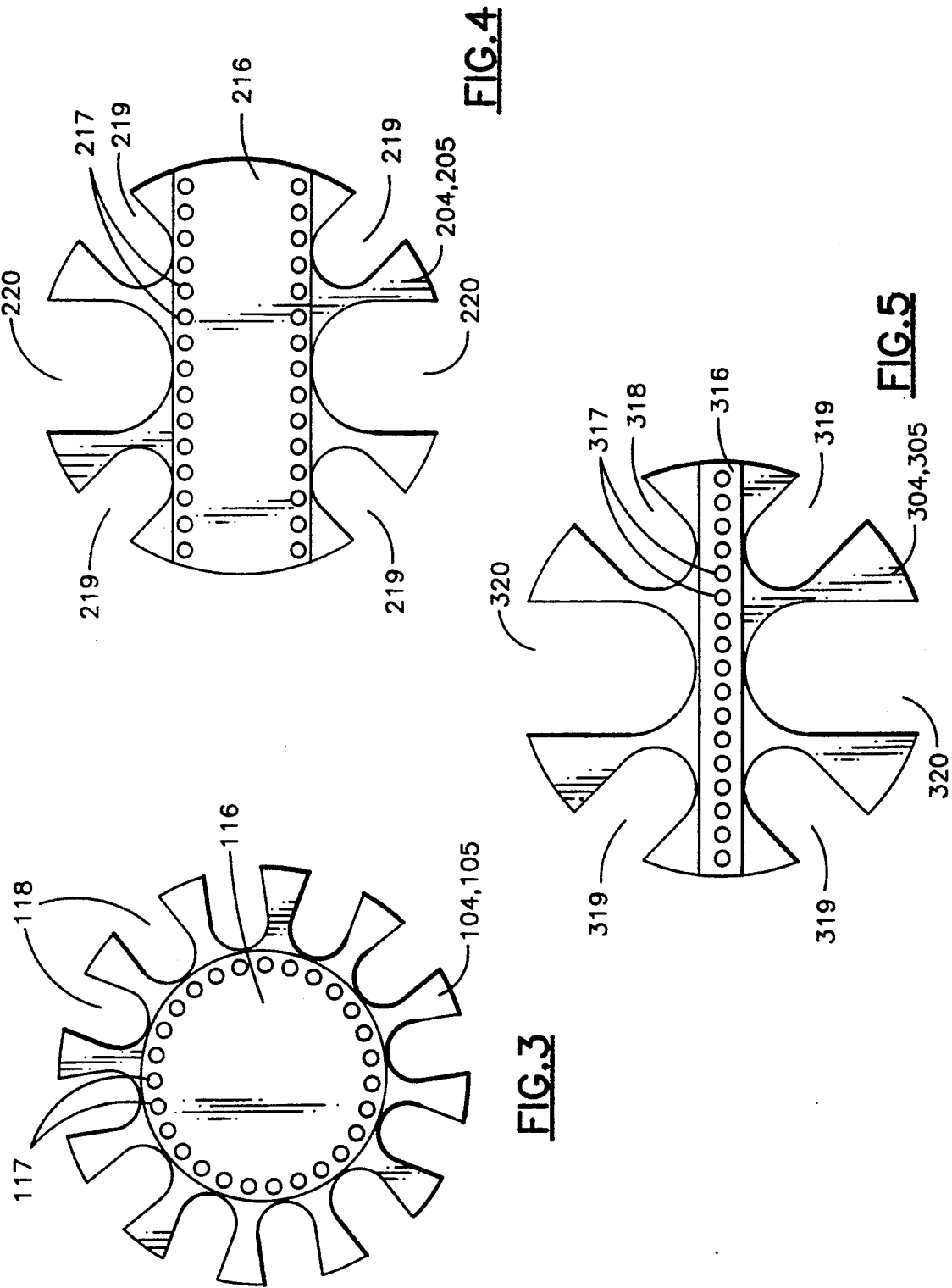

SLEEVE COUPLING FOR A BRANCHING OR CONNECTING POINT OF CABLES

BACKGROUND OF THE INVENTION

1. Field of the Invention

The invention relates generally to a sleeve coupling for a branching or connecting point of cables, and more particularly to connecting and branching communication cables having optical waveguides. The sleeve coupling comprises a sleeve surrounding the branching or connecting point, which is connected at the ends, in a liquid-tight manner, with end bodies penetrating into the sleeve. Each end body defines at least one through opening for leading a cable into or out of the sleeve coupling.

2. Description of the Prior Art

A sleeve coupling of this type is known from German DE-OS 38 17 795. In this patent, the sleeve and the end bodies each comprise two half-shells. Each end body has a central opening through which a main cable enters or exits. At a radial distance from the central opening, each end body has a through opening through which a branching cable passes. For the purpose of sealing, the half-shells are adhered to each other. Both the central opening and the through opening are sealed with their respective cable by means of a shrinkage tube. The annular gap formed between the sleeve and the end body is sealed by means of a clamping element. An advantage in this sleeve coupling is that, after loosening of the clamping element, the sleeve can be displaced over one of the end bodies, as a result of which the interior of the sleeve coupling becomes accessible. New cables can be connected by inserting them through the unoccupied through openings. The sleeve can then be returned to its original position and the clamping elements can again be installed thereabout.

A disadvantage in this sleeve coupling is that it is difficult to keep the seams between the half-shells permanently tight. Because of the considerable forces that have to be applied by the clamping element for proper sealing, damage to the seal can occur at the seams. In such situations, water can then enter the sleeve coupling and can make the sleeve coupling and, under certain conditions, the cable, unusable.

SUMMARY OF THE INVENTION

The present invention is therefore based on the task of improving the known sleeve coupling to the extent that, with retention of the advantageous properties, a reliable seal against the penetration of moisture is created. In addition, the production of the sleeve coupling, i.e., the arrangement of the cables, is simplified and, in particular, the later arrangement of branching cables is improved. The sleeve coupling of the present invention is designed for use with both cut and uncut cables.

The sleeve coupling of the present invention has the following characteristics:

a. The sleeve is a stable plastic tube with a longitudinal slot.

b. Each of the end bodies is provided with a circumferential surface on which the sleeve is supported.

c. The through openings are designed as radial slots adapted to receive the cables.

d. The sleeve and the end bodies are surrounded by a heat-shrunk collar, whose longitudinal edges are connected by a flexible attaching member and whose ends are shrunk onto the cable surface.

e. In the entrance region of the sleeve coupling, there is provided at least one cantilevered extension for the end body coated at least in part with a hot-melt adhesive, with whose surface the collar is in contact at least in part with its inner surface.

According to the teaching of the invention, the sleeve coupling is very stable and easy to assemble as a result of the use of sleeve and the end bodies. The sleeve, made of relatively rigid plastic, such as, for example, polyethylene, has a good resilience capacity and readily returns to the form of a tube with a narrow slot. As a result of the heat-shrunk collar, which encapsulates the sleeve and end bodies, an absolutely reliable sealing against entering moisture is provided. The sleeve coupling is easy to reopen and can accordingly be used subsequently with another branch cable.

The sealing of the entrance region is carried out by means of a hot-melt adhesive, which is located on the inner surface of the coupling and the surface of the cantilevered extension, and which becomes liquid at the shrinkage temperature. During the shrinking process, the collar is held together between the cables by means of a tool, for example, a pair of pliers, a clamp, etc. After cooling, the hot-melt adhesive solidifies and holds the collar together in the region between the cables.

The extension for the end body is particularly advantageously designed in such a way that the outward facing front surface of the extensions contains a plurality of blind holes, into which is inserted at least one part, such as a clamp, spring, pin, etc., fixing the collar between itself and the surface of the extension. The clamps, springs or pins essentially serve to bring the collar into contact with the major part of the cable surface.

The extension can be designed in a number of ways. It has proved advantageous, however, that the extension be designed as a cylindrical part and that the emerging or entering cables are in contact with the circumferential surface of the extension. The extension can be in solid form or formed with a curved shape. As an alternative to this, it is possible to design the extension with a flattened profile, for example, as a plate, on which the cables may be fixed on opposite sides thereof. The extension performs the essential tasks of bridging the relatively large difference in diameter between the sleeve and, for example, an optical waveguide cable and of permitting the sealing of the sleeve coupling by means of the heat-shrinking collar.

The extension can be made of plastic or any other material. It has proved advantageous, however, to make the extension of metal, e.g., aluminum or an aluminum alloy, or of a metal-coated plastic. In this manner, the heat applied during the shrinkage heating is transferred into the interior of the casing formed by the collar, whereby a particularly reliable and simple seal is achieved. If the extension and the end bodies are made in one piece, a stable design of the end regions of the collar is obtained. On inwardly facing surfaces of the end bodies, there are located pegs to which the cables are clamped. However, alternatively, openings can be provided in the extension, through which a tightening strap is passed. The tightening strap is placed around the cables to hold them in place.

The end bodies are kept at a distance from each other and connected with each other by means of at least one rail. This is advantageous, because, in this way, the spacing between the end bodies is fixed, whereby the mounting of the sleeve therearound leads to a snug fit of the ends of the sleeve with the flanges of the end bodies. This rail also serves to hold the splice cassettes for providing the optical waveguide splice.

In order to separate the sleeve and end bodies from each other for the reopening of the sleeve coupling, both the longitudinal slot of the sleeve and the slot between the sleeve and the end body proceeding on the circumferential side are covered with an adhesive strip, which is to prevent a penetration of hot-melt adhesive into the slot.

BRIEF DESCRIPTION OF THE DRAWINGS

The invention will be explained with reference to the accompanying drawings, in which:

FIG. 2 is a perspective view of two end bodies and their connecting rail prior to assembly.

FIGS. 3 through 5 are end views of different embodiments of end bodies.

DESCRIPTION OF THE PREFERRED EMBODIMENTS

Figure 1:
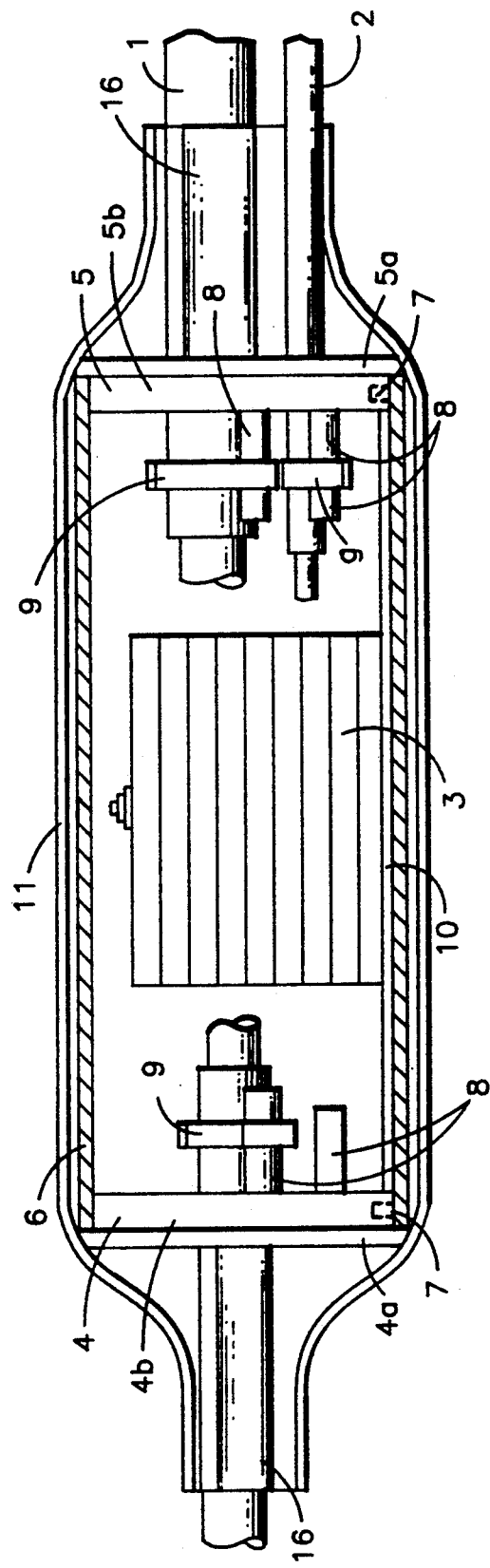
FIG. 1 is a side elevational view of the sleeve coupling with portions broken away to illustrate internal structure.

The cable entering into the sleeve coupling is designated by the numeral 1, with a branch cable 2 branching off from the cable 1. In the preferred embodiment, both the cable 1 and the branch cable 2 are intended to be optical waveguide cables, although the invention can also be used for electrical cables. The connections of the optical fibers of cables 1 and 2, which are not shown in detail but are known to those skilled in the art, are located within a splice cassette 3, which is arranged within the sleeve coupling. The sleeve coupling has two end bodies 4 and 5. Circumferential surfaces 4b and 5b of the end bodies 4 and 5 are in contact with and support a longitudinally slotted plastic tube 6. From the circumferential surfaces (4b, 5b) of the end bodies 4 and 5, there project flanges 4a and 5a, respectively, which abut the slotted plastic tube 6 at its ends.

The end bodies 4 and 5, as is described in greater detail with reference to FIG. 2, each contain a plurality of radial slots (12, 13, 14, 15) for insertion of the cables 1 and 2. In the region of the inward facing ends, there are provided semi-circular cantilevered pegs 8, which are firmly mechanically connected to the end bodies 4 and 5 and form a part thereof. The cables 1 and 2 are fastened to the pegs 8 with clamps 9 (FIG. 1) for the purpose of providing strain relief at the connecting point at the splice cassette 3. The end bodies 4 and 5 are connected with a rail 10 which is screwed in place as shown at 7 into the recessed areas 4c, 5c in the circumferential surfaces 4b, 5b. The rail 10 fixes the distance between the end bodies 4 and 5 and ensures that the slotted plastic tube 6 is in abutting contact with the flanges 4a and 5a. The outer closure of the sleeve coupling is formed by a heat-shrunk collar 11, which is provided by a sheet of cross-linked plastic, whose longitudinal edges are held together by a flexible attaching member (not shown). The length of the collar 11 is dimensioned such that it covers the plastic tube 6 and the end bodies 4 and 5 and is shrunk onto the entering and exiting cables 1 and 2. The longitudinal slot of the plastic tube 6 and the circumference-side gaps between the plastic tube 6 and the end bodies 4 and 5 are covered over with an adhesive tape, in a manner not shown.

FIG. 2 shows the two end bodies 4 and 5 before their assembly. The end bodies 4 and 5 show several radial slots (12, 13, 14, 15) into which the cables 1 and 2 or additional cables are inserted. From the outward facing surface of each of the end bodies 4 and 5 there projects a cantilevered extension 16, which forms a part thereof. Blind holes 17 are introduced into the front surface of the extension 16. These blind holes 17, as will be described further hereinafter, serve to seal the end of the sleeve coupling.

FIGS. 3-5 show views of various alternate embodiments of the end bodies. The end body 104, 105 according to FIG. 3 shows a multiplicity of radial slots 118 for the reception of a multiplicity of relatively thin branch cables. The extension 116 has a cylindrical shape. A number of blind holes 117 are located on its outer periphery.

According to FIG. 4, the end body 204, 205 shows two large radial slots 220 and four smaller radial slots 219. The extension 216 is parallelepiped in shape and is provided with blind holes 217 in its front surface.

According to FIG. 5, the end body 304, 305 shows two large radial slots 320 and smaller radial slots 319. The extension 316 is parallelepiped in shape and is provided with blind holes 317 in its front surface.

Figure 7:
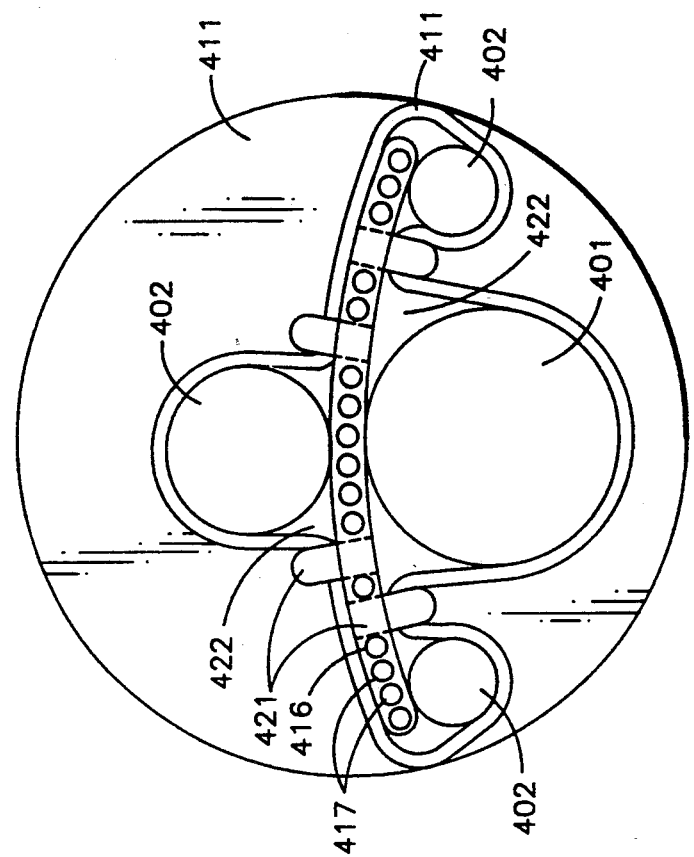
FIG. 7 is an end view of the sealed end region of another sleeve coupling.
Figure 6:
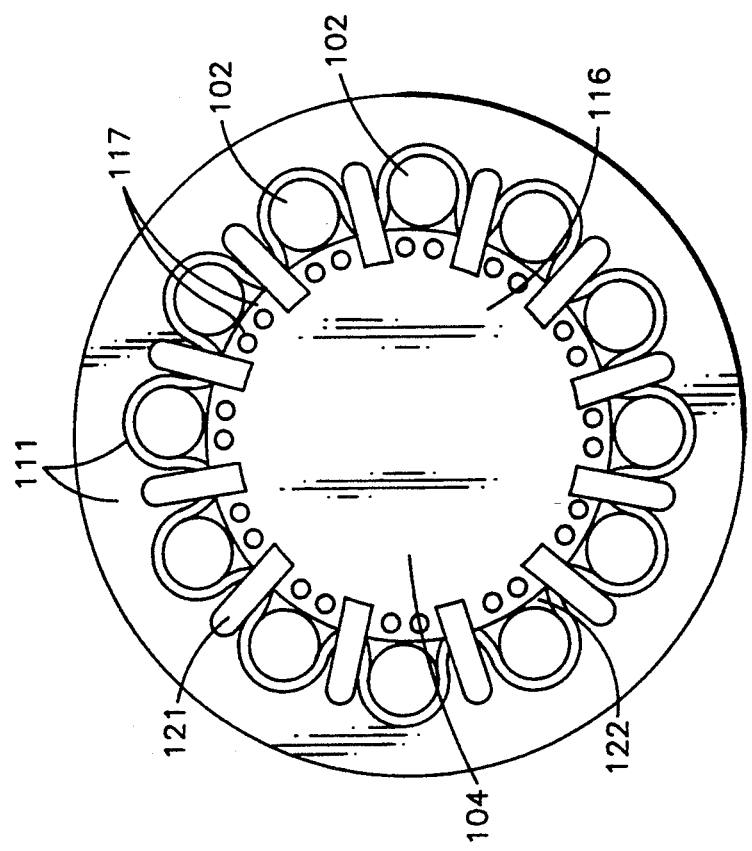
FIG. 6 is an end view of the sealed end region of a sleeve coupling using the end body of FIG. 3.

FIGS. 6 and 7 show views of the sealed end region of two different sleeve couplings.

A number of relatively thin branch cables 102 emerge from the sleeve coupling according to FIG. 6. The end body 104 is similar to that shown in FIG. 3 and has a cylindrical shape. The collar 111 is molded around the branch cables 102 before shrinkage by means of the plug elements 121. The plug elements 121 are introduced into the blind holes 117 in the cylindrical extension 116. An arm of the plug element 121 is located on the outer surface of the collar 111. The gaps 122 located between the collar 111 and the branch cables 102 are filled in and sealed during the shrinkage process by means of the hot-melt adhesive provided at the surface of the collar 111.

FIG. 7 shows another development of the invention. The cable 401 and two branch cables 402 branched off from the cable 401 lie on one side of the extension 416, which is slightly curved and has essentially the shape of a parallelepiped. Another branch cable 402 is located on the side opposite to the cable 401. The collar 411 is molded around the cables 401, 402 and the extension 416 with the help of plug elements 421 which are inserted in the blind holes 417. The gaps 422 are filled in and sealed by hot-melt adhesive during the shrinkage process.

The important advantage achieved by means of the invention is that, as a result of the extension, the collar can completely seal the end region. This would normally be difficult to achieve because of the large difference in diameter between the cable and the sleeve, since a large amount of stretching, of over 400 percent, is not generally possible. On the other hand, the diameter of the sleeve in optical waveguide cables, because of the fiber supply to be expected and its turn diameter, can have a value of up to 100 mm, whereas the cable diameter is of the magnitude of 10 mm.

What is claimed is:

1. Sleeve coupling for a connecting point of cables, particularly of communication cables with optical waveguides, comprising a sleeve surrounding the connecting point, which, at each end, is connected in a liquid-tight manner with an end body penetrating into the sleeve, with each end body having at least one through opening for a cable, wherein:
   a. the sleeve is a stable plastic tube with a longitudinal slot;
   b. each of the end bodies has a circumferential surface on which the sleeve is supported;
   c. the through openings are radial slots adapted to receive the cables;
   d. the sleeve and the end bodies are surrounded by a heat-shrunk collar, whose longitudinal edges are connected by a flexible attachment member and whose ends are shrunk onto the cable surfaces; and
   e. in each entrance region of the sleeve coupling there is provided an extension means for the end body coated at least in part with hot-melt adhesive, the heat-shrunk collar is in contact at least in part with an inner surface of the extension.

2. The sleeve coupling according to claim 1, wherein a plurality of blind holes is provided in an outward facing front surface of the extension means, into which at least one part for holding the collar onto a surface of the extension means is inserted.

3. The sleeve coupling according to claim 2, wherein the extension means has a cylindrical shape and the cables are in contact with a circumferential surface of the extension means.

4. The sleeve coupling according to claim 2, wherein the extension means has a flattened profile adapted to receive cables on opposite sides thereof.

5. The sleeve coupling according to claim 4, wherein the extension means is made of metal.

6. The sleeve coupling according to claim 4, wherein the extension means and its respective end body are made as a single piece.

7. The sleeve coupling according to claim 6, wherein the end bodies are kept at a distance from each other and are connected with each other by means of at least one rail fastened therebetween.

8. The sleeve coupling according to claim 1, wherein each of the end bodies has a flange-like expansion adjacent its respective circumferential surface, the sleeve abuts said flange-like expansion.

9. The sleeve coupling according to claim 1, wherein the extension means has a cylindrical shape and the cables are in contact with a circumferential surface of the extension means.

10. The sleeve coupling according to claim 1, wherein the extension means has a flattened profile adapted to receive cables on opposite sides thereof.

11. The sleeve coupling according to claim 1, wherein the extension means is made of metal.

12. The sleeve coupling according to claim 1, wherein the extension means and its respective end body are made as a single piece.

13. The sleeve coupling according to claim 1, wherein the end bodies are kept at a distance from each other and are connected with each other by means of at least one rail fastened therebetween.

14. The sleeve coupling according to claim 1, wherein gaps between the extension and the cables and the heat-shrunk collar are filled in by hot-melt adhesive.

* * * * *